United States Patent

Kovak et al.

[11] Patent Number: 5,159,816
[45] Date of Patent: Nov. 3, 1992

[54] METHOD OF PURIFYING ARGON THROUGH CRYOGENIC ADSORPTION

[75] Inventors: Kenneth W. Kovak, Macungie; Rakesh Agrawal; Janice C. Peterson, both of Allentown, all of Pa.

[73] Assignee: Air Products and Chemicals, Inc., Allentown, Pa.

[21] Appl. No.: 700,022

[22] Filed: May 14, 1991

[51] Int. Cl.⁵ .............................. F25J 3/04; F25J 3/00
[52] U.S. Cl. ........................................ 62/22; 62/11; 62/17; 62/18
[58] Field of Search .................... 62/11, 17, 18, 22; 55/16, 66

[56] References Cited

U.S. PATENT DOCUMENTS

| | | | |
|---|---|---|---|
| 3,928,004 | 12/1975 | Bligh et al. | 55/66 |
| 3,996,028 | 12/1976 | Golorko et al. | 55/58 |
| 4,144,038 | 3/1979 | Armond | 55/66 X |
| 4,239,509 | 1/1980 | Bligh et al. | 55/66 |
| 4,421,530 | 12/1983 | Dalton, Jr. et al. | 55/66 X |
| 4,421,531 | 12/1983 | Dalton, Jr. et al. | 55/66 X |
| 4,477,265 | 10/1984 | Kumar et al. | 55/66 X |
| 4,715,873 | 12/1987 | Auvil et al. | 62/22 X |
| 4,715,874 | 12/1987 | Erickson | 62/22 |
| 4,737,177 | 4/1988 | Erickson | 62/22 |
| 4,834,956 | 5/1989 | Agrawal et al. | 55/66 X |
| 4,836,836 | 6/1989 | Bennet et al. | 62/22 |
| 4,983,194 | 1/1991 | Hopkins et al. | 62/22 |
| 4,994,098 | 2/1991 | Agrawal et al. | 62/22 |
| 5,035,726 | 6/1991 | Chen et al. | 55/16 |

Primary Examiner—Henry A. Bennet
Assistant Examiner—Christopher Kilner
Attorney, Agent, or Firm—Russell L. Brewer; James C. Simmons; William F. Marsh

[57] ABSTRACT

This invention relates to an improved process for preparing high purity argon employing a cryogenic adsorptive technique. In the process air is separated into its components and a crude argon feed containing 0.8 mol % oxygen or less and 0.5 mol % nitrogen or less is generated. The crude argon feed is initially subjected to cryogenic adsorption for effecting nitrogen removal and then further subjected to cryogenic adsorption for effecting removal of oxygen. By conducting cryogenic adsorption in this manner, essentially no supplemental refrigeration is required in the cryogenic adsorption steps.

5 Claims, 2 Drawing Sheets

METHOD OF PURIFYING ARGON THROUGH CRYOGENIC ADSORPTION

TECHNICAL FIELD

This invention relates to an improvement in a cryogenic adsorption process for the purification of a crude argon stream containing nitrogen and oxygen impurities.

BACKGROUND OF THE INVENTION

Air separation is widely practiced and one well known process generally involves the cryogenic distillation of air in a distillation system comprising a main distillation zone for separating nitrogen and oxygen and an argon side-arm column wherein crude argon is recovered from the cryogenic distillation process. Typically, the distillation system comprises a double-distillation column wherein air is introduced to a high pressure column and a low pressure column. An argon side stream is generated in the low pressure column and withdrawn from that column for further refinement. Any nitrogen in the argon stream is recovered as an overhead from the argon side column along with the argon. Typically, the overhead stream will contain from 2-5 mol% oxygen and 1 mol% of nitrogen. The balance of the stream comprises argon. Oxygen is withdrawn from the bottom of the column.

Argon recovery and purification for use in metallurgical and electronics applications is important to the air separation industry. There have generally been two approaches used for the further refinement of a crude argon stream to produce high purity argon. One technique has been referred to as catalytic hydrogenation and is effected by contacting the crude argon stream with a hydrogen containing atmosphere in the presence of a metal such as nickel, palladium, or a metal getter whereby the residual oxygen is reacted with the hydrogen generating water vapor. This stream then is cooled and cryogenically distilled for removing the nitrogen therefrom. Alternatively, the crude argon stream may be purified by a treatment process referred to as cryogenic adsorption. In that technique nitrogen is initially removed by contacting with an adsorbent suited for the preferential adsorption of nitrogen and then the essentially nitrogen free argon stream is contacted with an adsorbent suited for the preferential adsorption of residual oxygen in the stream. Representative patents which disclose variations of the catalytic hydrogenation process are as follows:

U.S. Pat. No. 4,994,098 discloses a cryogenic process for the preparation of crude argon. The cryogenic process typically involves a three column system wherein there is a high pressure, low pressure and an argon column in communication with each other. A structured or ordered packing is used in at least a portion of the argon column to promote liquid and vapor mixing with minimal pressure drop in the argon column. As a result, greater separation of argon from oxygen is achieved and a crude argon stream having reduced oxygen content is generated. The oxygen concentration typically is less than 0.5 mol%.

U.S. Pat. No. 4,983,194 discloses a double-distillation column system for the separation of air incorporating an argon side-arm column. Crude argon stream having an argon purity of less than about 0.8 mole % oxygen is withdrawn from the column, condensed and then subsequently vaporized prior to passing the stream over a bed of one or more reduced metal getters on a suitable catalyst support. Representative metal getters include copper, nickel or combinations thereof which are regenerable by reduction with hydrogen.

Representative patents showing the removal of oxygen or nitrogen or both from a crude argon stream using cryogenic adsorption techniques are shown in the following patents:

U.S. Pat. No. 3,928,004 discloses passing a crude argon stream having less than about 3.5% nitrogen and more than 1% oxygen through a molecular sieve bed which preferentially adsorbs oxygen. This molecular sieve typically is a 4A or sodium exchanged molecular sieve and cryogenic adsorption is effected at temperatures of about $-275°$ F. ($-170°$ C.) for effecting removal of the oxygen. The oxygen is desorbed from the sieve by evacuation of the bed and flushing with an inert gas.

U.S. Pat. No. 3,996,028 discloses a process for the purification of a crude argon stream containing oxygen by passing the argon stream through synthetic zeolites of the A type having entry voids from 2.8 to 4.2 Angstroms. The oxygen is adsorbed at a pressure of 21.38 to 427 psia and desorbed by reducing the pressure of atmospheric pressure with subsequent vacuum treatment of the zeolites typically, $1-10^{-2}$ mm Hg. By using cryogenic adsorption, the patentees where able to overcome disadvantages associated with catalytic hydrogenation using a hydrogen as had been used in the prior art. The patentees overcame problems associated with the cryogenic adsorption of oxygen from argon by using a refrigerant comprising liquified nitrogen, liquefied oxygen, and mixtures thereof or liquefied argon boiling under gauge pressure. Utilization of these refrigerants eliminated the formation of bimers of argon and oxygen and it eliminated a number of disadvantages associated with the use of liquid oxygen as a refrigerant. In addition the use of the mixture of gases afforded an opportunity for easy change of adsorption temperature by adjustment of the refrigerant pressure.

U.S. Pat. No. 4,239,509 discloses a process for the cryogenic adsorption of oxygen and nitrogen from a crude argon stream which offers advantages over the processes described in the '004 and '028 patents just described. The process involves purifying a crude argon stream containing approximately 2% oxygen and 0.5% nitrogen by passing the crude stream through a molecular sieve suited for the preferential adsorption of nitrogen, e.g., a 5A molecular sieve at a temperature of about $-280°$ F. such that the stream exiting the 5A molecular sieve does not exceed a temperature of about $-250°$ F. That stream then is passed through a bed containing a molecular sieve suited for the preferential adsorption of oxygen, e.g., a 4A molecular sieve. Residual oxygen is removed from the stream. To maintain a bed temperature of a least $-250°$ F. or below during the removal of oxygen, the molecular sieve adsorption system was designed such that the 5A molecular sieve adsorption system encapsulated the 4A adsorption system. By carrying the adsorption of nitrogen from the argon at a temperature well below about $-250°$ F., it was possible to maintain the 4A zone at a temperature of $-250°$ F. or below. Encapsulation of the adsorption zone containing the 4A molecular sieve with the adsorption zone containing the 5A molecular sieve eliminated many of the problems associated with the use of liquid oxygen and other refrigerants for maintaining bed temperature which were used in the prior art.

SUMMARY OF THE INVENTION

This invention relates to an improvement in the cryogenic adsorption process for the production of high purity argon from a crude argon stream containing both nitrogen and oxygen contaminants. A crude argon stream is obtained by the fractional distillation of an argon-enriched side stream from a cryogenic air separation distillation system. The improvement in a cryogenic adsorption system for removing the nitrogen and oxygen impurities from the crude argon stream by cryogenic adsorption technique involves the steps of generating a crude argon stream containing less than 0.8 mol% preferably less than 0.5 mol% oxygen and less than 0.5 mol% nitrogen in an argon side arm column from a cryogenic distillation system, passing the crude argon stream through an adsorption zone containing a molecular sieve preferentially suited for the removal of nitrogen and then passing the resulting argon stream essentially free of nitrogen through an adsorption zone containing a molecular sieve preferentially suited for the removal of oxygen. Essentially no refrigeration is used in the nitrogen or oxygen adsorption steps to maintain bed temperature. A substantially pure argon stream is removed.

There are significant advantages associated with the process of this invention. These advantages include, an ability to recover argon high purity with high selectivity; an ability to effect cryogenic adsorption of both the nitrogen and oxygen removal without using refrigerant to maintain adsorption temperatures; an ability to recover argon with excellent recovery rates of argon; and an ability to use conventional equipment for the separation.

DETAILED DESCRIPTION OF THE INVENTION

The present invention relates to an improved process for the recovery of high purity argon from air at high recovery. In a first step, air is separated in cryogenic distillation system. Typically, air is separated in a distillation system comprising a high pressure column, a low pressure column, and an argon sidearm column. Oxygen and nitrogen can be recovered in various combinations and purities depending on the selected process conditions and equipment configurations. A sidestream consisting essentially of argon, and residual amounts of nitrogen and oxygen is withdrawn from the low pressure column and further rectified in the argon sidearm column to produce a crude argon stream, which in turn is purified further to remove oxygen and other contaminants to yield a high purity argon product. In the present invention, the argon sidearm column is designed and operated such that a crude argon product containing less than about 0.8 mol%, preferably less than 0.5 mol%, and most preferably less than 0.2 mol% oxygen is produced. Argon recovery of greater than about 90% optionally can be achieved at this crude argon purity by utilizing a structured packing or a combination of structured packing and conventional sieve trays. Structured packing is defined as a geometrically placed packing which promotes vapor and liquid mixing and intermixing in a direction perpendicular to the primary flow direction and allows a pressure drop per unit length with is significantly lower than conventional vapor-liquid contacting devices such as sieve trays or bubble cap trays. Such structured packing is well known in the art and is available commercially in various configurations.

Crude argon from the argon sidearm column of the present invention typically contains up to about 0.5 mol% nitrogen as well as the oxygen impurity described above. These impurities are removed in the present invention by cryogenic adsorption which steps remove nitrogen and oxygen respectively. Removal of nitrogen and oxygen by means of cryogenic adsorption is economically feasible according to the present invention because the refrigeration load to refine and purify crude argon is much lower than in prior art argon recovery processes.

Figure 1:
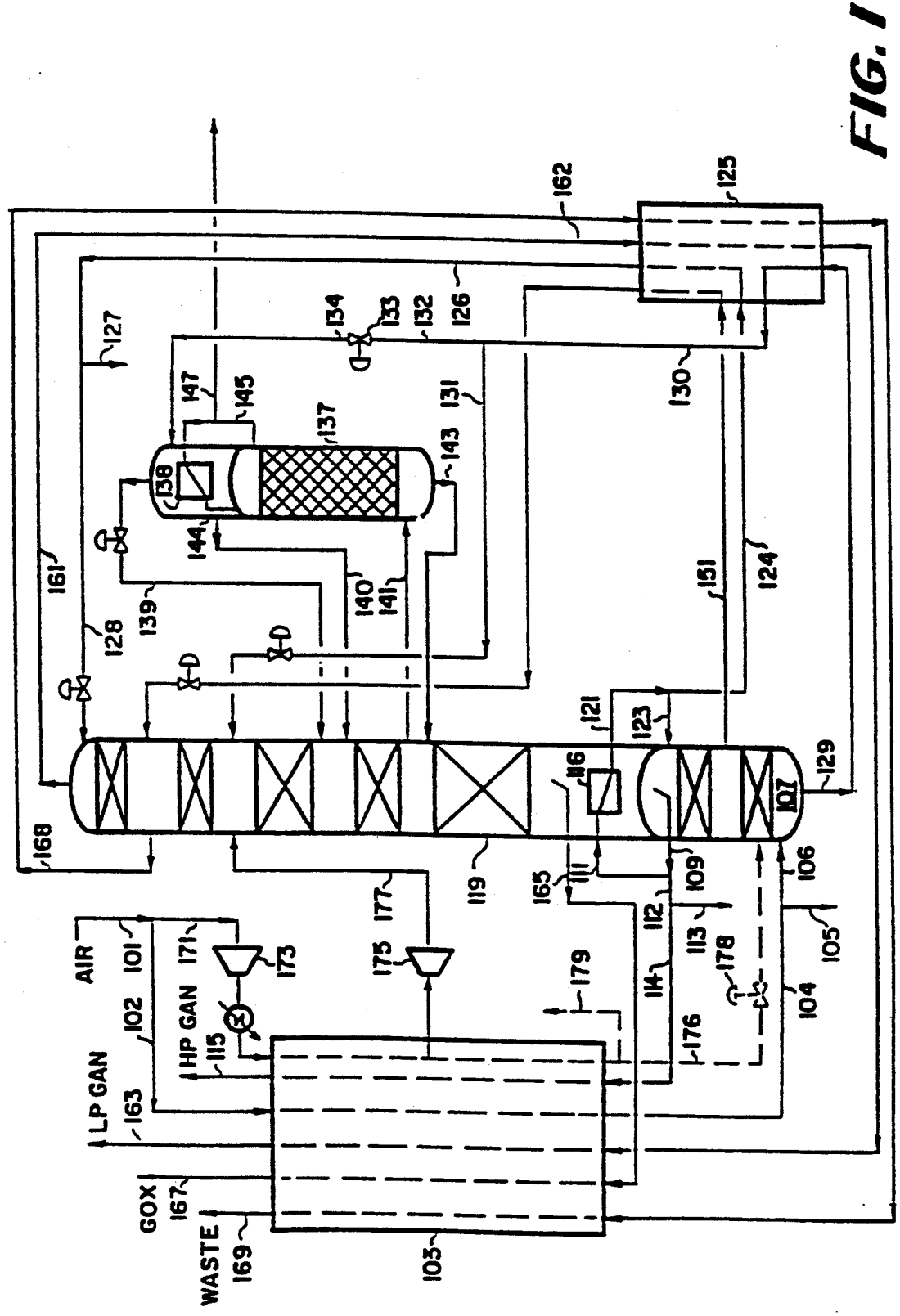
FIG. 1 is a schematic diagram of a typical three column air separation process for producing a crude argon stream, oxygen and nitrogen products.

Referring now to FIG. 1, a stream of pressurized air which is essentially free of water and carbon dioxide enters the process through line 101 and is split into two streams 102 and 171. Stream 102 is cooled in heat exchanger 103 and the cooled stream 104 which flows into high pressure distillation column 107. Optionally, stream 104 may be split with a side stream 105 being removed for further processing and stream 106 introduced to high pressure column 107. Stream 106 is separated into nitrogen-rich high-pressure overhead stream 109 and an oxygen-rich bottoms stream 129. Stream 109 is split into streams 111 and 112. Stream 112, optionally may be split into streams 113 which may be used for further processing and 114. Stream 114 is warmed in exchanger 103 and is discharged as high-pressure nitrogen product 115 (HP GAN); the other portion of the high-pressure nitrogen, stream 111, is condensed against boiling liquid oxygen in reboiler 116 located in the bottom liquid sump of low pressure distillation column 119. Condensed nitrogen stream 121 is split into stream 123, which provides reflux to column 107, and stream 124 is subcooled in heat exchanger 125; the resulting subcooled stream 126. Optionally, stream 126 may be split into stream 127 for further processing and stream 128. After pressure reduction, stream 128 is fed as reflux into the top of low pressure column 107 via line 151, cooled in heat exchanger 125, reduced in pressure, and then charged to low pressure column 119.

The crude liquid oxygen stream 129 from the bottom of high pressure column 107 is subcooled in heat exchanger 125, and the cooled stream 130 optionally is split into streams 131 and 132. Stream 131 optionally is let down in pressure and fed at an intermediate point into low pressure column 119; stream 132 is let down in pressure across valve 133 and stream 134 of reduced pressure is warmed on the boil side of reboiler-condenser 138 of argon sidearm column 137. Liquid stream 140 is fed to an intermediate point of low pressure distillation column 119, and the vapor stream 139 formed by the vaporization of stream 134 is fed to column 119 near the feed point of stream 140.

Sidestream 141 containing oxygen and argon with a minor amount of nitrogen is fed into the bottom of argon sidearm distillation column 137 and is separated into crude argon overhead vapor stream 145 and bottoms stream 143, which is returned to the low pressure column 119 near the withdrawal point of stream 141. A portion of crude argon overhead stream 145 is withdrawn as stream 147, and the remaining portion is condensed in reboiler-condenser 138 to yield liquid stream 144 which is fed as reflux to argon column 137. Sidearm distillation column 137 can contain trays, structured packing, or a combination thereof to promote vapor-liquid contacting and mass transfer sufficient to produce a crude argon overhead vapor stream containing less than about 0.8 mol%, preferably less than 0.5 mol%, and most preferably less than 0.2 mol% oxygen. This stream will also contain less than 0.5 mol%, and preferably less than 0.15 mol% nitrogen.

The second portion of the feed air, stream 171, is compressed in compressor 173, cooled against external refrigeration, further cooled in heat exchanger 103, expanded in expander 175, and is passed as stream 177 into low pressure column 119 at an intermediate point. In some cases it is desirable to withdraw a liquid air stream 176 from the main exchanger 103, expand it for example across valve 178, and feed it to the high pressure column 107 so that liquid products can be withdrawn from the air separation system. Sidestream 168 is withdrawn from low pressure column 119 at an upper intermediate point, warmed in heat exchangers 125 and 103 to recover refrigeration, and is discharged as waste stream 169. Overhead nitrogen stream 161 is warmed in these same two exchangers and is discharged as low pressure nitrogen product stream 163 (LP GAN). Oxygen vapor stream 165 is withdrawn from above the bottom sump of column 119 and warmed in exchanger 103 to yield gaseous oxygen product stream 167 (GOX). Finally, high pressure nitrogen stream 114 is warmed in exchanger 103 and discharged as high pressure nitrogen product stream 115.

The crude argon vapor in stream 147 which is at a temperature generally ranging from about $-250°$ F. to $-290°$ F. and contains not more than 0.8 mol%, and preferably not more than 0.5 mol% oxygen and not more than 0.5 mol% nitrogen is passed to alternating adsorption vessels 201 and 202. Crude argon overhead stream 147 may be condensed against stream 134 in a heat exchanger (not shown) and a crude liquid argon stream is obtained. The pressure of this crude liquid argon stream is then increased under the static head or it is pumped to a higher pressure. If the low pressure column 119 pressure is close to the ambient pressure, the pressure of the pressurized crude liquid argon stream can be 30–50 psia. This pressurized crude liquid argon stream is then vaporized against a suitable process stream to provide the pressurized vapor feed stream for the cryogenic adsorption system. The suitable process streams to be condensed against the vaporizing crude liquid argon stream can be either of optional streams 105, 113 or 179. The heat exchangers where these vaporizations take place are not shown.

Figure 2:
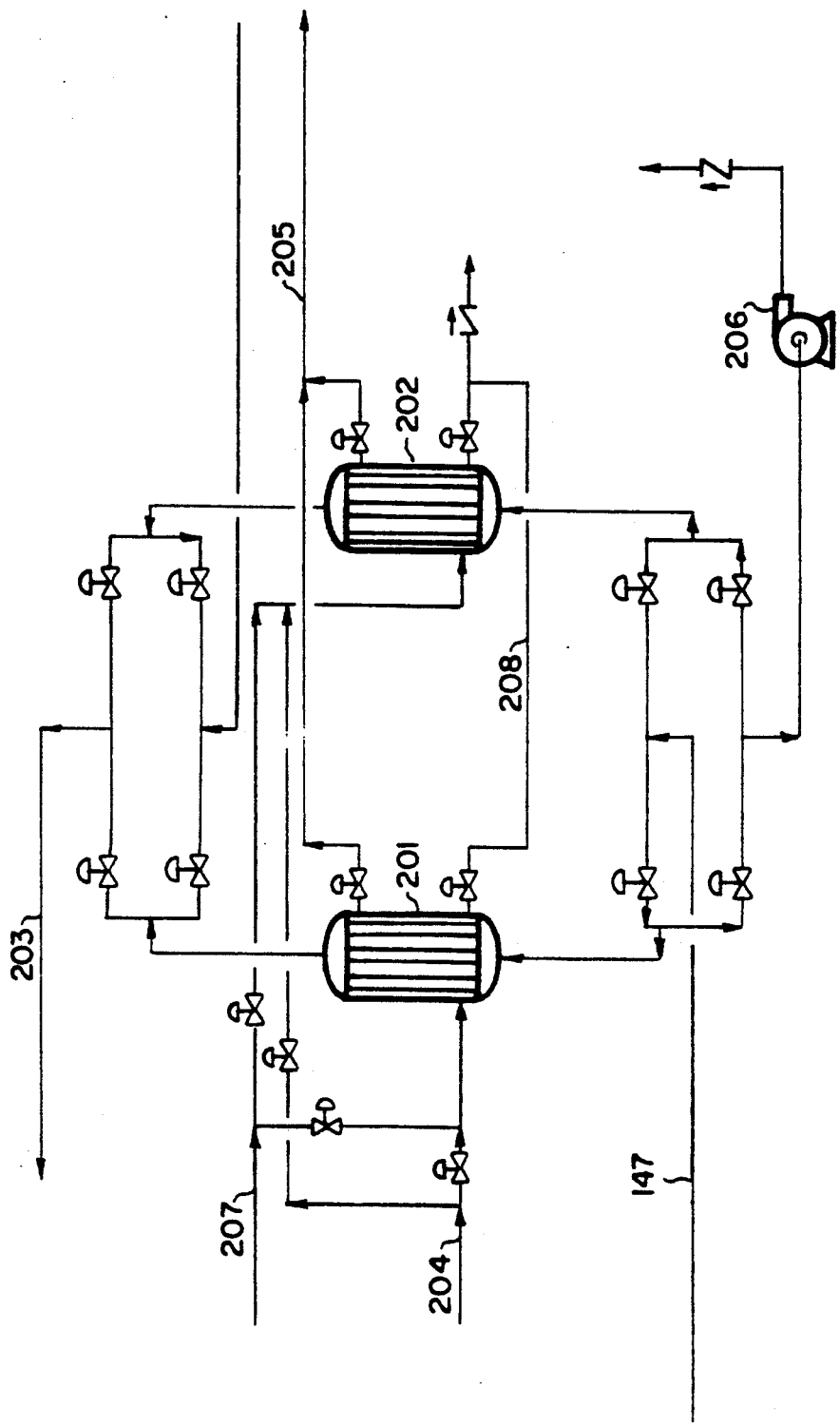
FIG. 2 is a schematic diagram of a cryogenic adsorption process for impurities from crude argon to produce high purity argon.

To facilitate an understanding of the cryogenic adsorption process, reference is made to FIG. 2. Adsorption vessels 201 and 202 contain a molecular sieve which is suited for the preferential adsorption of nitrogen from the crude argon stream. Typically this molecular sieve is a 5A molecular sieve although other molecular sieves which are designed for the preferential adsorption of nitrogen can be used.

An argon stream containing oxygen but essentially free of nitrogen, e.g. less than about 5 ppmv of nitrogen is generated within the initial molecular sieve bed in adsorption vessel 201 and once nitrogen is removed from the stream it is ready for physical adsorption of oxygen therefrom. Adsorption vessels 201 and 202 also are charged with a molecular sieve suited for the preferential adsorption of oxygen from the argon stream. Typically a 4A molecular sieve is used for this adsorption although other molecular sieves which are suited for the preferential adsorption of oxygen can be substituted therefore. A purified argon stream containing less than about 5 ppmv oxygen and 5 ppmv nitrogen is recovered via line 203.

Representative sieves for nitrogen and oxygen adsorption include 5A, 4A, mordenite, 13X chabazite, oerionite, and so forth and representative cations which may be exchanged with sodium ions in the molecular sieves include potassium, lithium, calcium and so forth.

Adsorption vessels 201 and 202 are operated such that essentially no refrigeration is required during the adsorption step and by virtue of not requiring refrigeration for this step, the process provides a significant power savings advantage over prior art processes. A flowrate is maintained in these vessels such that very little temperature rise is observed in the molecular sieve beds. The reduced impurity content in the feed has been found to substantially aid in being able to control localized temperature excursions in the beds. To assure high selectivity and high recovery of argon, a space velocity based on total cross-sectional area of the bed of from 0.025 to 0.25 feet per second is used.

For ease of physical adsorption of the impurities by the molecular sieves and regeneration thereof, adsorption vessels 201 and 202 are shell and tube heat exchangers with the molecular sieve contained in the tube side of the adsorption vessel. The 4A molecular sieve is packed on top of, as opposed to admixed with, the 5A molecular sieve. Optionally, two sieves can be arranged in sequence with one vessel containing the 5A molecular sieve and the other vessel containing the 4A molecular sieve. Sequential removal of nitrogen and oxygen from the crude argon stream is effected in a manner similar to that when the beds are one on top of the other. Argon is recovered via line 203 from adsorption vessels 201 and 202.

When breakthrough occurs, that is, when the adsorption beds are depleted of adsorption capacity as indicated by an increase in containment levels in the product stream exiting the adsorption vessel on line 203, the adsorbent is regenerated by simple techniques. To effect regeneration, gaseous nitrogen is introduced via line 204 to flush the argon remaining in the void spaces of the tubes containing the 5A and 4A molecular sieves and removed via line 205.

Desorption is effected by contacting the molecular sieves with a warm gas, e.g. air, argon or pure nitrogen having a temperature of about $-50°$ to $-150°$ F. which is introduced via line 204. Even though other gases such as helium, krypton, and xenon may be used, the preferred gas is nitrogen. Although this temperature is low, it is sufficient to drive oxygen and nitrogen impurities from the molecular sieve. In contrast to a prior art process, the adsorbent need not be heated to prior art high temperatures, e.g. greater than 100° F. in order to effect removal of oxygen and nitrogen impurities from the bed. As a result, less refrigeration is required to effect cooldown of the molecular sieve prior to bringing the adsorption vessel on stream for removal of impurities. This results in tremendous power savings.

On completion of desorption by direct contact with warm $-50°$ to $-150°$ F. gas, the flow of the warm gas is terminated in line 204 and the tubes are evacuated to a pressure of approximately 1 to 100 torr by means of vacuum pump 205. Evacuation by vacuum pump 205 accomplishes removal of any residual warming gas from the pores of the adsorbent prior to cooling of the absorbent for subsequent reuse. After evacuation, the tubes of adsorption vessels 201 and 202 are flushed with argon. This is necessary if the warming gas contained nitrogen or argon. If a gas such as helium is used to heat the sieves which is not adsorbed, then this step is unnecessary. If needed, the argon stream used for flushing the sieves can be heated above regeneration temperatures.

With the removal of warming gas from the pores of molecular sieve, the molecular sieves may be cooled by indirect heat exchange with liquid nitrogen which is introduced via line 207. This liquid can be obtained from a suitable place, e.g. stream 127, from the air separation unit of FIG. 1. During cooldown, any argon used to flush the molecular sieve after evacuation is terminated to prevent pre-loading of the molecular sieve with the cooling gas or any liquid during temperature reduction of the molecular sieve. Typically, cooldown of the molecular sieve is accomplished by passing a refrigerant through the shell side of adsorption vessels 201 and 202. Once operating temperature of the adsorption vessels 201 and 202 is achieved, the adsorption vessels may be used again for adsorption. Any liquid remaining in the shell side of the adsorption vessels 201 and 202 may be drained via line 207 and the adsorption commenced.

Through the use of the improved cryogenic adsorption process described herein, argon purities of 99.9998 mol% having less than 5 ppmv nitrogen and 5 ppmv oxygen can be obtained.

We claim:

1. A process for the production of high purity argon comprising:
   (a) recovering an argon-enriched sidestream from a cryogenic air separation distillation system;
   (b) passing said argon-enriched sidestream into an argon sidearm column and withdrawing therefrom a crude argon stream containing less than about 0.8 mole% oxygen and less than 0.5 mol% nitrogen;
   (c) passing said crude argon stream into a final purification system comprising a cryogenic adsorption system for the removal of nitrogen and the removal of oxygen by physical adsorption by first passing the crude argon stream at a rate to provide a space velocity of 0.25 to 0.25 feet per second through a molecular sieve suited for the preferential adsorption of nitrogen and then through a molecular sieve suited for the preferential adsorption of oxygen whereby said physical adsorption being performed essentially refrigeration free; and
   (d) withdrawing from said final purification system a stream of said high purity argon.

2. The process of claim 1 wherein the cryogenic adsorption of nitrogen and oxygen from said argon stream is conducted at a temperature from −250° F. to −290° F.

3. The process of claim 2 wherein said nitrogen and oxygen impurity components are removed from said crude argon product by the sequential steps of:
   a) passing said crude argon product as a gas through a bed of a 5A molecular sieve whereby nitrogen is physically adsorbed by said molecular sieve and withdrawing therefrom an essentially nitrogen free argon product;
   (b) passing said essentially nitrogen free argon product as a gas through a 4A molecular sieve whereby oxygen is physically adsorbed by said molecular sieve and withdrawing therefrom said high purity argon product; and,
   (c) maintaining an essentially refrigeration free process during said physical adsorption steps.

4. The process of claim 3 wherein said molecular sieves for removing nitrogen and for removing oxygen are regenerated by effecting the steps:
   a) passing nitrogen through said molecular sieves to flush argon therefrom;
   b) desorbing the molecular sieves used for the physical adsorption of nitrogen and oxygen by contacting said molecular sieves with a gas selected from the group consisting of nitrogen, helium, xenon and krypton at a temperature from −50° F. to −150° F.;
   c) evacuating said bed by withdrawing gas therefrom;
   d) cooling said bed by indirect heat exchange with a refrigerant to adsorption temperatures.

5. In process for the separation of air and recovering high purity argon therefrom, the improvement which comprises:
   (a) feeding a compressed and cooled feed air stream to the high pressure column of a multiple distillation column system comprising a high pressure column, a low pressure column, and an argon sidearm column for the separation of air;
   (b) rectifying air into a crude liquid oxygen bottoms and a high pressure nitrogen overhead in said high pressure column;
   (c) distilling the crude liquid oxygen bottoms from the high pressure column in the low pressure column generating a liquid oxygen product bottoms fraction, an argon rich sidestream and a nitrogen product overhead, the high pressure column and low pressure column being thermally linked together;
   (d) condensing the high pressure nitrogen overhead against the liquid oxygen product bottoms in said low pressure column;
   (e) withdrawing liquid oxygen product bottoms, said argon side stream, and nitrogen product from the low pressure column;
   (f) distilling the argon sidestream in said argon side column generating a crude argon overhead containing less than 0.5 mol% nitrogen and less than 0.5 mol% oxygen and a bottoms fraction consisting of oxygen;
   (g) returning said oxygen fraction to the low pressure column;
   (h) passing said crude argon overhead as a gas through a bed of a 5A molecular sieve at a rate to provide a space velocity of 0.25 to 0.25 feet per second whereby nitrogen is physically adsorbed by said molecular sieve and withdrawing therefrom an essentially nitrogen free argon product;
   (i) passing said essentially nitrogen free argon product as a gas through a 4A molecular sieve at a rate to provide a space velocity of 0.025 to 0.25 feet per second whereby oxygen is physically adsorbed by said molecular sieve and withdrawing therefrom said high purity argon product; and
   (j) maintaining an essentially refrigeration free process during said physical adsorption steps.

* * * * *

UNITED STATES PATENT AND TRADEMARK OFFICE
CERTIFICATE OF CORRECTION

PATENT NO. : 5,159,816

DATED : November 3, 1992

INVENTOR(S) : Kenneth W. Kovak, et. al.

It is certified that error appears in the above-identified patent and that said Letters Patent is hereby corrected as shown below:

Column 7, Claim 1, line 6, after "of" delete "0.25" and insert "0.025" and insert-- "velocity of 0.025 to 0.25 feet per second"--.

Column 8, Claim 5, line 3, after "of" delete "0.25" and insert "0.025" and insert "provide a space velocity of 0.025 to 0.25 feet per second"--.

Signed and Sealed this

Thirtieth Day of November, 1993

Attest:

BRUCE LEHMAN

Attesting Officer

Commissioner of Patents and Trademarks